United States Patent
Park et al.

(10) Patent No.: US 8,779,636 B2
(45) Date of Patent: Jul. 15, 2014

(54) LINEAR VIBRATOR HAVING BROADBAND

(71) Applicant: LG Innotek Co., Ltd., Seoul (KR)

(72) Inventors: Youngil Park, Seoul (KR); Kapjin Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/894,070

(22) Filed: May 14, 2013

(65) Prior Publication Data

US 2013/0249325 A1    Sep. 26, 2013

Related U.S. Application Data

(63) Continuation of application No. 13/094,056, filed on Apr. 26, 2011, now Pat. No. 8,461,728.

(30) Foreign Application Priority Data

Apr. 26, 2010  (KR) .......................... 10-2010-0038316

(51) Int. Cl.
*H02K 33/00*    (2006.01)

(52) U.S. Cl.
USPC ........................... 310/15; 340/407.1; 381/417

(58) Field of Classification Search
USPC ........ 310/81, 14, 15, 17; 340/407.1; 381/417, 381/420–422
IPC ................................................ H02K 7/00,7/06
See application file for complete search history.

(56) References Cited

U.S. PATENT DOCUMENTS

| | | | |
|---|---|---|---|
| 6,812,607 B1 | 11/2004 | Sun | |
| 7,038,335 B2 | 5/2006 | Choi et al. | |
| 7,106,878 B2 | 9/2006 | Saiki et al. | |
| 8,242,641 B2 | 8/2012 | Bae et al. | |
| 8,461,728 B2 * | 6/2013 | Park et al. | 310/15 |

FOREIGN PATENT DOCUMENTS

KR    10-2008-0108389 A    12/2008
KR    10-2010-0010236 A    2/2010

OTHER PUBLICATIONS

Office Action dated Jun. 21, 2011 in Korean Application No. 10-2010-0038316, filed Apr. 26, 2010.

* cited by examiner

*Primary Examiner* — Dang Le
(74) *Attorney, Agent, or Firm* — Saliwanchik, Lloyd & Eisenschenk

(57) ABSTRACT

A linear vibrator is disclosed having a structure capable of generating a large vibratory force with a small size, outputting various types of vibrations in a wide bandwidth, and accurately coupling the magnet, the linear vibrator including: a case providing an inner space; a trembler including a yoke formed with a circular plate-shaped wing unit, a one inner lateral end-closed, cylindrical insertion unit bent from the wing unit to have a stair, an inner magnet coupled by being inserted into the insertion unit, and an external magnet coupled to one surface of the wing unit; an elastic member fixed at one end to the case and fixed at the other end to the trembler; and a stator fixed to the case to vibrate the trembler.

4 Claims, 3 Drawing Sheets

LINEAR VIBRATOR HAVING BROADBAND

CROSS-REFERENCE TO RELATED APPLICATIONS

This application is a continuation of U.S. patent application Ser. No. 13/094,056. filed Apr. 26, 2011. which claims the benefit under 35 U.S.C. §119 of Korean Patent Application No. 10-2010-0038316. filed Apr. 26, 2010. which are hereby incorporated by reference in their entirety.

BACKGROUND

The present disclosure relates to a linear vibrator, and more particularly to a small-sized linear vibrator having a structure capable of generating a great vibratory force, outputting various types of vibrations in broadband and accurately coupling a magnet.

Generally, a linear vibrator is employed for generating vibration in electronic appliances, such as mobile phones, gaming machines, portable information terminals or the like, using electromagnetic force between a magnet and a coil. Particularly, the linear vibrator is variably used to haptic devices due to high demand on tactility. Recently, as devices using a trembler are diversified and miniaturized, a small-sized linear vibrator capable of generating a large vibration volume is greatly demanded.

A conventional linear vibrator is such that when a current is applied to a coil, operation of the vibrator is initiated by electromagnetic force formed between the coil and the magnet to vertically vibrate the trembler in association with elasticity of a spring.

However, the conventional linear vibrator has a disadvantage in that vibration thereof can be felt only in the vicinity of resonant frequency. A trembler according to the conventional linear vibrator is such that one resonant frequency exists in a 100~300 Hz band, and a moving distance and vibration volume reach a peak value in a limited range near the resonant frequency, wherefrom the vibration can be felt by a man.

It is understood that vibration volume felt by a man in the haptic devices is over 0.1 G, a frequency band from which vibration can be well detected by a man is generally in the range of 100~300 Hz, and a frequency band detectable in sound is in the range of 20 Hz to 20,000 Hz.

Meanwhile, a mobile terminal using haptic technology largely uses a linear vibrator whereby miniaturization can be realized and tactility can be provided when a button on a touch screen is depressed. The linear vibrator needs an additional member such as a weight to increase vibration volume due to limit of the vibration volume. The limit of vibration volume is mainly solved by a method of using a peak value in the resonant frequency, in relation to limit of vibration volume and vibratory force in the linear vibrator.

Due to the fact that a difference of fine frequency can be detected at about 10 Hz in the resonant frequency band, only one vibration can be felt in the haptic devices.

Therefore, there is a disadvantage in the conventional linear vibrator in that it is difficult to realize various vibratory feelings through frequency variation due to the fact that the vibration range mainly felt by a man is limited to near 10 Hz when a touch screen is touched.

In case of broadening an actually usable frequency band (i.e., usable band from which vibratory force exceeding approximately 0.1 G detectable by a man can be generated) for generating various types of vibrations, vibrations having a broadened range of resonant frequency must be generated. However, due to the limit of size of linear vibrator and limit of vibratory force, the conventional linear vibrator cannot help but use vibrations of a narrow region near the resonant frequency.

In addition, the conventional linear vibrator is disadvantageous in that there is no means to centralize a position of a magnet in a yoke coupling the magnet, such that it is difficult to centralize the magnet in the coupling process. In case the magnet is not centrally and accurately positioned in the yoke, an unfavorable vibration may be generated due to mass center of vibration not being centrally positioned on the yoke, and an impediment to accurate control of vibration may be generated.

The present disclosure is disclosed to solve the abovementioned disadvantages in whole or in part, and it is an object of the present disclosure to provide a linear vibrator capable of generating vibrations in a broad range deviated from resonant frequency and having a structure capable of generating a high vibratory force in a broad band to allow detecting various vibrations.

It is another object of the present disclosure to provide a linear vibrator capable of outputting in a frequency band generating a sound and various vibrations through a structure capable of providing a high vibratory force.

It is still another object of the present disclosure to provide a linear vibrator capable of providing an accuracy and rapidity in coupling process of vibrator.

BRIEF SUMMARY

In order to achieve at least the above objects, in whole or in part, and in accordance with the purposes of the present disclosure, as embodied and broadly described, and in one general aspect of the present disclosure, there is provided a linear vibrator, the linear vibrator comprising: a case providing an inner space; a trembler including a yoke formed with a circular plate-shaped wing unit, a one inner lateral end-closed, cylindrical insertion unit bent from the wing unit to have a stair, an inner magnet coupled by being inserted into the insertion unit, and an external magnet coupled to one surface of the wing unit; an elastic member fixed at one end to the case and fixed at the other end to the trembler; and a stator fixed to the case to vibrate the trembler, whereby the linear vibrator has an advantage of providing a greater vibratory force in broadband.

Preferably, the trembler further includes a weight coupled to the other surface of the wing unit, whereby a tremblery force of the trembler can be further increased.

Preferably, each of the inner and external magnets has an opposite magnetic polarity to a direction of vibrating the trembler, whereby directions of magnetic fluxes between an inner surface and an outer surface of the coil can be advantageously matched to increase the tremblery force.

Preferably, the weight is made of a magnetic material, whereby leakage of magnetic flux can be inhibited to increase magnetic flux efficiency.

Preferably, the linear vibrator comprises a magnetic fluid circularly coated on a space formed by the yoke and the elastic member to fix a position by magnetic flux leaked from the inner magnet, whereby collision among members can be inhibited to absorb shocks.

Preferably, the linear vibrator comprises a plate coupled to the external magnet and a bottom end of the inner magnet.

Preferably, at least one of the yoke and the plate is formed with a magnetic material, whereby leakage of magnetic flux can be minimized to increase vibratory force.

Preferably, a resonant frequency of the linear vibrator is lower than a useable frequency detectable by vibration or sound source, whereby the linear vibrator has an advantage of generating vibrations at broadband due to utilization of a region higher than the range of the resonant frequency.

Preferably, the linear vibrator oscillates a vibration frequency detectable in the range of 30 Hz to an upper side ~150 Hz to the bottom side, whereby a linear vibrator having broadband can be provided.

Preferably, a frequency band up to a maximum usable frequency detectable by vibration or sound source based on resonant frequency is 1.2 times greater than a frequency band to a minimum usable frequency, whereby a linear vibrator can be provided capable of generating vibrations to a range farther than that of the resonant frequency.

In another general aspect of the present disclosure, there is provided a linear vibrator, the linear vibrator formed with a spring, a magnet and a coil, comprising: a groove portion into which the magnet is centrally inserted; and a wing unit formed by being extended to a peripheral direction, wherein the linear vibrator further includes a yoke elastically supported to the spring and a weight coupled to an opposite surface into which the magnet is inserted.

As apparent from the foregoing, there is an advantage in the linear vibrator according to the present disclosure in that a vibration bandwidth can be greatly broadened over that of the conventional art to increase a frequency range detectable by a user and to allow the user to experience various types of vibration feelings.

There is another advantage in the linear vibrator according to the present disclosure in that sufficient vibratory force can be generated in a broad range to provide various types of vibration feelings in a limited size.

There is still another advantage in the linear vibrator according to the present disclosure in that a structure capable of accurately centralizing a magnet in a trembler can be provided to further increase accuracy in coupling the magnet.

BRIEF DESCRIPTION OF DRAWINGS

The accompanying drawings, which are included to provide a further understanding of the disclosure and are incorporated in and constitute a part of this application, illustrate an embodiment of the disclosure and together with the description serve to explain the principle of the disclosure. In the drawings.

DETAILED DESCRIPTION

Figure 1:
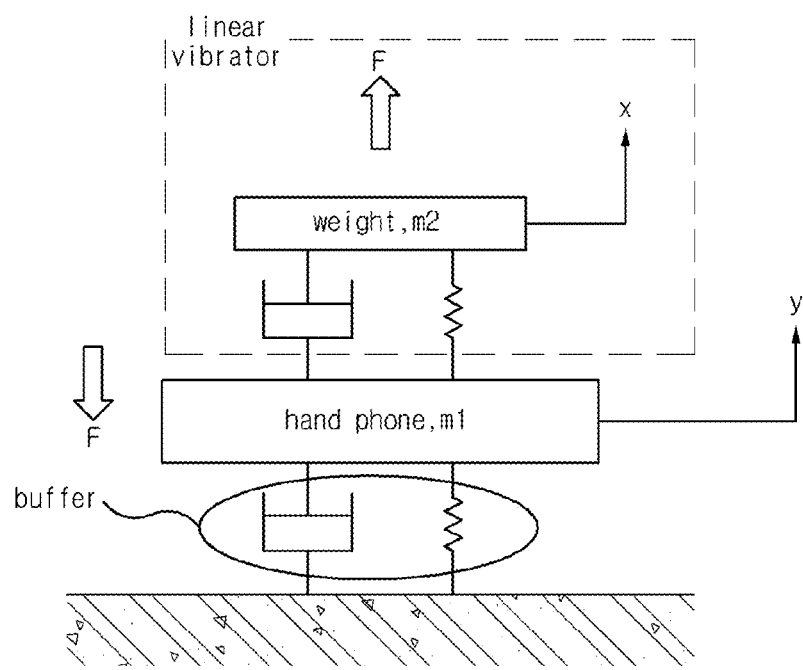
FIG. 1 is a schematic view illustrating a modeling of 2 degree of freedom (DOF) system of a linear vibrator.

Hereinafter, exemplary embodiments of the present disclosure will be described in detail with reference to the accompanying drawings. In the drawings, sizes or shapes of constituent elements may be exaggerated for clarity and convenience.

In describing the present disclosure, detailed descriptions of constructions or processes known in the art may be omitted to avoid obscuring appreciation of the invention by a person of ordinary skill in the art with unnecessary detail regarding such known constructions and functions.

Accordingly, particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

Now, construction and operation of the linear vibrator according to the exemplary embodiments of the present disclosure will be described in detail with reference to the accompanying drawings.

FIG. 1 is a schematic view illustrating a modeling of Two (2)-Degree-of-Freedom (DOF) system of a linear vibrator, where m1 is a mass of a mobile device having a hand phone or a touch liquid crystal, m2 is a mass of a trembler, c is a damping coefficient, and k is a modulus of elasticity of a spring.

Referring to FIG. 1, the linear vibrator is generally coupled to an inner side of a device, and illustrates a trembler, a device including a hand phone and a cushioning device from an upper end of the Two (2)-Degree-of-Freedom (DOF) system.

The Two (2)-Degree-of-Freedom (DOF) system thus configured may be expressed by the following Equation.

$$M\begin{bmatrix}\ddot{x}\\\ddot{y}\end{bmatrix}+C\begin{bmatrix}\dot{x}\\\dot{y}\end{bmatrix}+K\begin{bmatrix}x\\y\end{bmatrix}=\begin{bmatrix}F\\-F\end{bmatrix},\ F=F_0\sin\omega t$$

$$\text{where } M=\begin{bmatrix}m_2 & 0\\0 & m_1\end{bmatrix},\ C=\begin{bmatrix}c_2 & -c_2\\-c_2 & c_1+c_2\end{bmatrix},\ K=\begin{bmatrix}k_2 & -k_2\\-k_2 & k_1+k_2\end{bmatrix},$$

$$x=Xe^{i\omega t},\ y=Ye^{i\omega t}$$

$$\begin{bmatrix}X\\Y\end{bmatrix}=A^{-1}\begin{bmatrix}F_0\\-F_0\end{bmatrix},\text{ where } A \text{ is the system matrix}$$

where x and y define displacements of the vibrator and hand phone device, and matrix A represents an entire matrix of the system. Furthermore, F value defines a force vibrated by electromagnetic force.

At this time, the value of F relates to weight, moving distance and each frequency, which can be simply expressed in an equation of $F=md\omega^2$. where m is a mass, d is a moving distance and $\omega(2\pi f)$ defines each frequency. As noted in the equation, the force is in proportion to mass and moving distance, and in proportion to the square of each frequency.

Therefore, the present disclosure proposes a concept in which a trembler can vibrate in a broad region of vertical range based on resonant frequency.

That is, the conventional linear vibrator is such that, because detectable vibration is generated only in a limited region of resonant frequency, the resonant frequency is set up at a low frequency in useable frequency region where actually detectable vibration is generated in order to broaden a band in which vibration can be detected.

The resonant frequency is related to the entire mass and strength of the system, such that the resonant frequency can be set up by changing mass and strength.

In the present disclosure, the resonant frequency band is preferably determined within an 80~180 HZ band. If the resonant frequency band is thus determined, the useable frequency region is used at a region higher than that of the resonant frequency, whereby vibration can be generated in a broad range.

However, if vibration is generated in a broad region deviated from the resonant frequency, as explained in the prior art, a structural subject of increasing vibratory force is proposed to generate detectable vibratory force, which will be described later.

Meanwhile, it should be appreciated that the concept of setting the resonant frequency lower than the actually useable frequency should not be interpreted as the detectable vibration being generated only in a region below the resonant frequency.

That is, a peak value is expressed in the resonant frequency in the prior art, and the tremblery force is quickly decreased in a vertical region of resonant frequency. Because of this reason, the detectable vibration is generated only in a considerably limited region up and down the resonant frequency, the description of which has been already explained.

However, in case of arranging the resonant frequency at a low region of useable frequency, a graph of experimental value illustrating a relationship between frequency and vibratory force shows a slow curve (described later), such that vibration fully detectable at a predetermined range below the resonant frequency can be also substantially generated. Therefore, the resonant frequency is preferably set up at a lower frequency region than that of the actually useable frequency region.

Based on the abovementioned theory, a concept is proposed in which a frequency band to a maximum useable frequency detectable by vibration or sound source based on resonant frequency is broader than a frequency band to a minimum useable frequency.

It should be noted that a higher band is broader than a lower band based on resonant frequency in the linear vibrator according to the present disclosure. Preferably, a ratio of lower band against the higher band is higher than 1.2.

For example, if the resonant frequency is 140 Hz, and the minimum frequency in the useable frequency is 30 Hz, the maximum frequency is set up at more than 272 Hz to allow a useable frequency bandwidth in the linear vibrator to be set up from 30 Hz to more than 272 Hz, such that various types of vibrations can be generated in most of regions where vibration can be detected.

As a result, a linear vibrator is provided that oscillates a vibration frequency where a range of from 30 Hz to 150 Hz in a frequency lower or higher than the resonant frequency can be detected. It should be apparent that the useable frequency band can be set up at a wider range so that even sound can be provided.

Meanwhile, in order to generate vibrations that can be detected at a band higher than the resonant frequency, force that moves the trembler must be large. That is, the F value must be large.

A concept is therefore proposed in the linear vibrator according to the present disclosure in which a conventional weight is preferably replaced by a magnet, whereby the tremblery force of the trembler is improved over the prior art.

Figure 2:
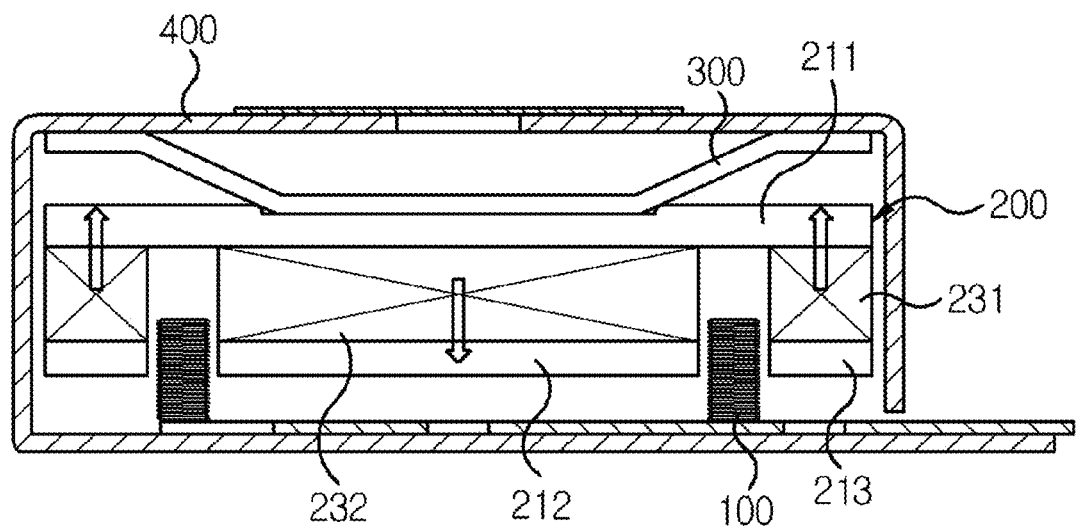
FIG. 2 is a lateral cross-sectional view illustrating a linear vibrator according to a first exemplary embodiment of the present disclosure.

FIG. 2 is a lateral cross-sectional view illustrating a linear vibrator according to a first exemplary embodiment of the present disclosure.

As in the conventional vibrator, the linear vibrator according to the first exemplary embodiment of the present disclosure includes a spring (300) in an inner lateral surface of a case (400) forming an exterior appearance of the trembler, and a trembler (200) under the spring (300) that is elastically supported.

The trembler (200) substantially takes the shape of a disk, and a magnet is arranged under the trembler (200). A coil (100) is fixedly arranged on a floor portion of the case (400), distanced at a predetermined space apart from the trembler (200).

Now, the shape of the trembler (200) will be described in more detail.

An inner magnet (232) is preferably arranged at a center of the trembler (200), and an outer magnet (231) is arranged near to a periphery of the trembler (200).

Thus, in a space between the outer magnet (231) and the inner magnet (232), the coil (100) disposed underneath the case (400) is horizontally arranged between the magnets (231, 232). It is therefore more efficient that the outer magnet (231) and the inner magnet (232) are arranged at an inner side and an outer side of the coil (100), because magnetic fluxes between the inner side and the outer side are formed in mutually opposite directions.

The coil (100) is discretely arranged between a periphery of inner magnet (232) and an inner surface of the outer magnet (231), whereby, if a current is applied to the coil (100), the trembler is vertically moved by mutual electromagnetic force generated between the magnets (231, 232), and is vibrated by elastic force of the spring (300).

It should be apparent that the magnets (231, 232) and the spring (300) may be also arranged underneath the case (400), and the magnets may be directly supported to the spring (300) instead of being supported to the spring (300) through a magnetic material (e.g., plate 211).

Furthermore, an upper plate (211) is interposed between the spring (300) and the magnets (231, 232) by replacing a conventional yoke. More preferably, bottom plates (212, 213) are arranged underneath the magnets (231, 232).

The plates (211, 212, 213) are arranged at both upper and bottom ends of the magnets (231, 232) and can therefore replace the conventional weight due to having a predetermined mass. Furthermore, the bottom plate (212) includes a doughnut-shaped bottom plate (212) that is arranged at a bottom end of the outer magnet (231) and a bottom plate (213) that is arranged at a bottom end of the inner magnet (232), in case the magnets are composed of the inner magnet and the outer magnet.

Meanwhile, more preferably, the outer and inner magnets (231, 232) are so arranged as to have an opposite magnetic flux from each other. This is because electromagnetic force can be maximized when polarities of the outer and inner magnets (231, 232) are oppositely formed due to the fact that magnetic fluxes are oppositely formed at inner and outer sides of coil.

Thus, FIG. 2 illustrates magnetic fluxes with opposite polarities indicated in arrows.

The magnetic flux of inner magnet (232) is formed downwards of the trembler, while the magnetic flux of outer magnet (231) is formed upwards of the trembler, whereby the tremblery force can be maximized if the current of the coil is applied to a proper direction. However, it should be apparent that directions of magnetic fluxes can be set up to opposite directions based on direction of applied current and rotational direction of coil.

Meanwhile the plates (211, 212, 213) are used to replace the conventional weight and yoke to increase the magnetic flux, and preferably formed with magnetic material. Therefore, the material of the plates (211, 212, 213) is preferably silicon steel plate or pure iron, but may be selectively chosen as long as leakage of magnetic flux is minimized.

Therefore, the minimized leakage of magnetic flux by using magnetic material (e.g., in plates 211, 212, 213) can increase magnetic flux volume to enhance efficiency of electromagnetic force generated by the coil, whereby the tremblery force of the trembler can be further increased.

Now, the arrangement of upper plate (211) and the bottom plates (212, 213) will be described in more detail with reference to FIG. 2.

The conventional back yoke functioning as a frame of the trembler is replaced by the upper plate (211). Thus, the upper plate (211) made of magnetic material is elastically supported from the upper side by the spring (300) to support the outer and inner magnets (231, 232) from the lower side.

Furthermore, the trembler is preferably configured in such a manner that the magnetic material is also formed at the distal end of the bottom side of the magnets (231, 232). Therefore, the bottom plates (212, 213) are respectively arranged at each distal end of the bottom sides of the outer magnet (231) and the inner magnet (232), where the inner bottom plate (212) arranged at a distal end of the bottom side of the inner magnet (232) may take the shape of a disk in transverse profile based on the shape of the magnet, and the outer bottom plate (213) arranged at a distal end of the bottom side of the outer magnet (231) may take the shape of a doughnut in transverse profile based on the shape of the magnet.

Meanwhile, it should be apparent that the magnetic flux efficiency of the bottom plates (212, 213) can be increased even if the magnets are not separated to the outside and to the inside as in the conventional art by respectively being arranged on the upper side and the distal ends of the bottom side.

Thus, the vertical vibration can be faithfully generated in the coil by the electromagnetic force due to the fact that the magnetic fluxes are not leaked out from both distal ends of magnets based on the concept that magnetic material is arranged on upper and bottom sides of magnets. The arrangement thus configured has an advantage of further increasing the vibration efficiency by the applied current.

Preferably, a volumetric ratio of the outer magnet (231) and that of the inner magnet (232) is approximately 1. In view of the foregoing, it is more preferable that the volumetric ratios be determined in the range of 0.8~1. This configuration makes the volumetric ratios almost the same to equalize the ratios of passing magnetic fluxes, further contributing to the increase of magnetic flux efficiency and vibratory force.

The trembler thus configured on the abovementioned concept can generate an approximate force of 20 grams force (g·f) over that of the conventional vibrator of approximate force of 2~3 g·f, where it can be noted that there is a great difference of vibratory force in between the two configurations.

Figure 3:
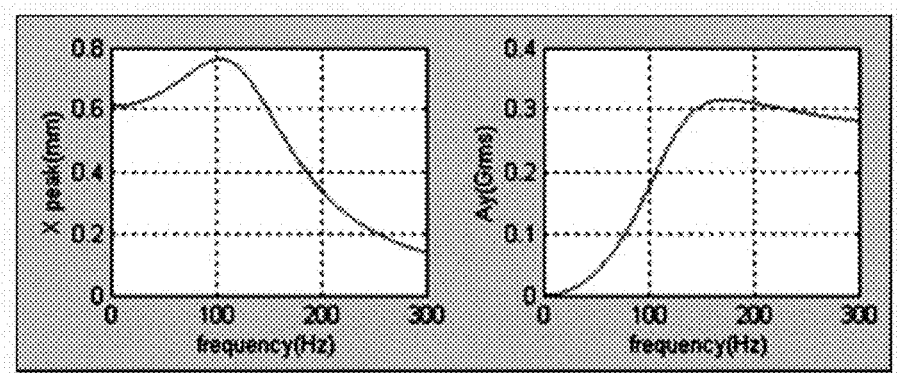
FIG. 3 is a graph illustrating relationship among frequency, moving distance of a trembler and vibratory force according to a first exemplary embodiment of the present disclosure.

FIG. 3 is an experimental data plot relative to moving distance and vibration volume of vibrator when most of the useable frequency is made higher than the resonant frequency according to the concept of the present disclosure, and when the tremblery force is increased based on structure of a linear vibrator according to a first exemplary embodiment of the present disclosure.

In the above experiment, m1 is set at 0.1 kg, m2 is set at 0.0008 kg, k1 is set at 11.3 N/m, k2 is set at 1070 N/m, c1 is set at 3.31 Ns/m, c2 is set at 0.6 Ns/m and F is set at 0.35 N.

The view at the left hand side of FIG. 3 illustrates a moving distance of vibrator based on frequency, where it should be noted that the resonant frequency is reduced to approximately 100 Hz, whereas the moving distance is more than 0.4 mm over the approximate range of 200 Hz in the vicinity of the resonant frequency.

The view at the right hand side of FIG. 3 illustrates the vibration volume of a trembler based on frequency, where although a peak value of vibration volume may be relatively lower than that of the prior art, all the peak values register more than 0.1 G at a region over 100 Hz, which means that effective vibration was generated in the region over 100 Hz, and a user can detect other vibrations in a wider range of frequency band through tactility of finger touch.

Figure 4:
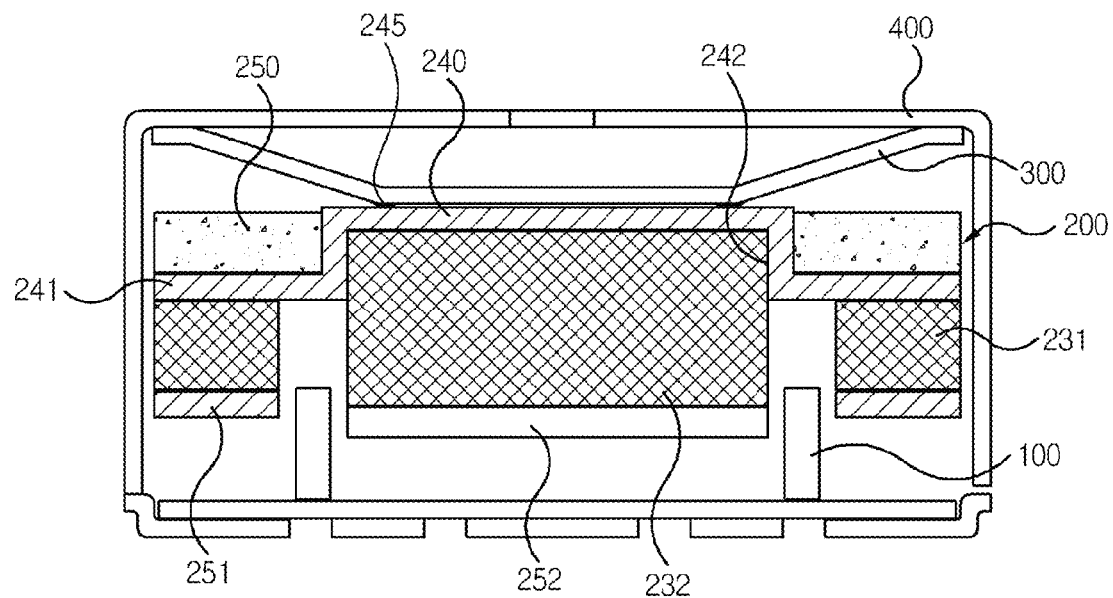
FIG. 4 is a lateral cross-sectional view illustrating a linear vibrator according to a second exemplary embodiment of the present disclosure.

FIG. 4 is a lateral cross-sectional view illustrating a linear vibrator according to a second exemplary embodiment of the present disclosure.

As explained above, a tremblery force stronger than that of the prior art is needed to generate vibratory force in the useable frequency band of a wider range deviated from the resonant frequency. Therefore, a linear vibrator excellent in assembly accuracy and capable of further increasing the tremblery force is proposed in the second exemplary embodiment of the present disclosure.

As in the linear vibrator according to the first exemplary embodiment of the present disclosure, the linear vibrator according to the second exemplary embodiment of the present disclosure includes a spring (300) in an inner lateral surface of a case (400) forming an exterior appearance of the trembler, and a trembler (200) under the spring (300) that is elastically supported.

The trembler (200) substantially takes the shape of a disk, and a magnet is arranged under the trembler (200). A coil (100) is fixedly arranged on a floor portion of the case (400), distanced at a predetermined space apart from the trembler (200).

Now, the shape of the trembler (200) will be described in more detail. An inner magnet (232) is preferably arranged at a center of the trembler (200), and an outer magnet (231) is arranged near to a periphery of the trembler (200).

Thus, in a space between the outer magnet (231) and the inner magnet (232), the coil (100) disposed underneath the case (400) is horizontally arranged between the magnets (231, 232). It is therefore more efficient that the outer magnet (231) and the inner magnet (232) are arranged at an inner side and an outer side of the coil (100), because magnetic fluxes between the inner side and the outer side are formed in mutually opposite directions.

The coil (100) is discretely arranged between a periphery of inner magnet (232) and an inner surface of the outer magnet (231), whereby, if a current is applied to the coil (100), the trembler is vertically moved by mutual electromagnetic force generated between the magnets (231, 232), and is vibrated by elastic force of the spring (300).

It should be apparent that the magnets (231, 232) and the spring (300) may be also arranged underneath the case (400), and the magnets may be directly supported to the spring (300) instead of being supported to the spring (300) through a magnetic material layer.

Meanwhile, although the first exemplary embodiment of the present disclosure has described a concept where the conventional yoke and weight are replaced by plates made of magnetic material, the second exemplary embodiment of the present disclosure proposes a concept where the conventional yoke is further improved in shape thereof.

A yoke (240) of a linear vibrator according to the present disclosure includes a doughnut-shaped plated wing unit (241) formed at a periphery side, and an insertion unit (242) centrally bent from the wing unit (241) with a stair shape. To be more specific, the insertion unit (242) includes a cylindrically bent unit formed perpendicularly to the center of the wing unit, and one end-closed floor unit. Thus, the insertion unit takes the shape of one end-closed cylinder.

The insertion unit is supported by the outer magnet (231) inserted thereinto. Preferably, an outer diameter of the outer magnet (231) corresponds with an inner diameter of the insertion unit at the yoke (240), and is press-fitted or coupled by bonding.

As explained above, the prior art is disposed with the magnet arranged in the center of the yoke, and the magnet is centrally formed at the yoke without a member for centering in consideration of interference with the coil to thereby cause an incorrect centering. However, it should be noted that, if the insertion unit concaved into the yoke (240) is formed, the centering becomes easy during coupling of the magnet.

Furthermore, the outer magnet (231) is arranged near to the periphery of the wing unit of the yoke (240). As in the first exemplary embodiment, the polarities of the inner and outer magnets (232, 231) are preferably opposite to a vertical direction.

Meanwhile, the linear vibrator according to the second exemplary embodiment of the present disclosure is such that a weight (250) is formed at an upper surface of the yoke (240).

To be more specific, a doughnut-shaped weight (250) is arranged at an upper side of the wing unit at the yoke, i.e., at an area facing the outer magnet (231) along the periphery. Furthermore, the weight is preferably formed with a magnetic material to inhibit leakage of magnetic flux.

A distal end at the bottom side of the magnet is preferably formed with a bottom plate for increasing mass and magnetic flux efficiency of the trembler. Therefore, a distal end at the bottom side of the outer magnet (231) is arranged with a bottom outer plate (251), and a distal end at the bottom side of the inner magnet (232) is arranged with a bottom inner plate (252).

At this time, the plates (251, 252) are formed with magnetic material to thereby minimize the leakage of magnetic flux. Material of the plates is preferably made of silicon steel plate or a pure iron, but may be selectively chosen as long as leakage of magnetic flux is minimized.

Therefore, the minimized leakage of magnetic flux by using the magnetic material can increase magnetic flux volume to enhance efficiency of electromagnetic force generated by the coil, whereby the tremblery force of the trembler can be further increased.

Magnetic fluid (245) is preferably arranged between the spring (300) and the yoke (240). The magnetic fluid (245) is prepared by stabilizing and dispersing magnetic particles in liquid in colloidal shape, and adding surfactant to inhibit generation of precipitation by gravity or magnetic field, and the magnetic particles exist in the shapes of super fine particles.

The magnetic fluid (245) functions to maximally limit contact with the spring (300) when the trembler (200) is vibrated, and to absorb shocks generated during the contact with the spring (300).

The magnetic fluid (245) is arranged on an upper surface of the yoke (240) for being precisely secured, and is preferably arranged at a position corresponding to the periphery of the inner magnet (232). Thus, the magnetic flux leaked from the inner magnet (232) fixes the position of the magnetic fluid (245), and then the magnetic fluid (245) is positioned on the upper surface of the yoke in the shape of a circle.

Meanwhile, the distal end of bottom side of the inner magnet (232) or a bottom distal end of the bottom inner plate (252) is preferably formed deeper into a direction of the coil (100) than the bottom end of the outer magnet (231) or bottom outer plate (251). At this time, a lead wire is inserted into the periphery of the coil (100), such that shock caused by the outer magnet (231) or the bottom end of the bottom outer plate (251) can be advantageously inhibited, even if soldering or sealing is performed to allow an outside current to be applied.

Figure 5:
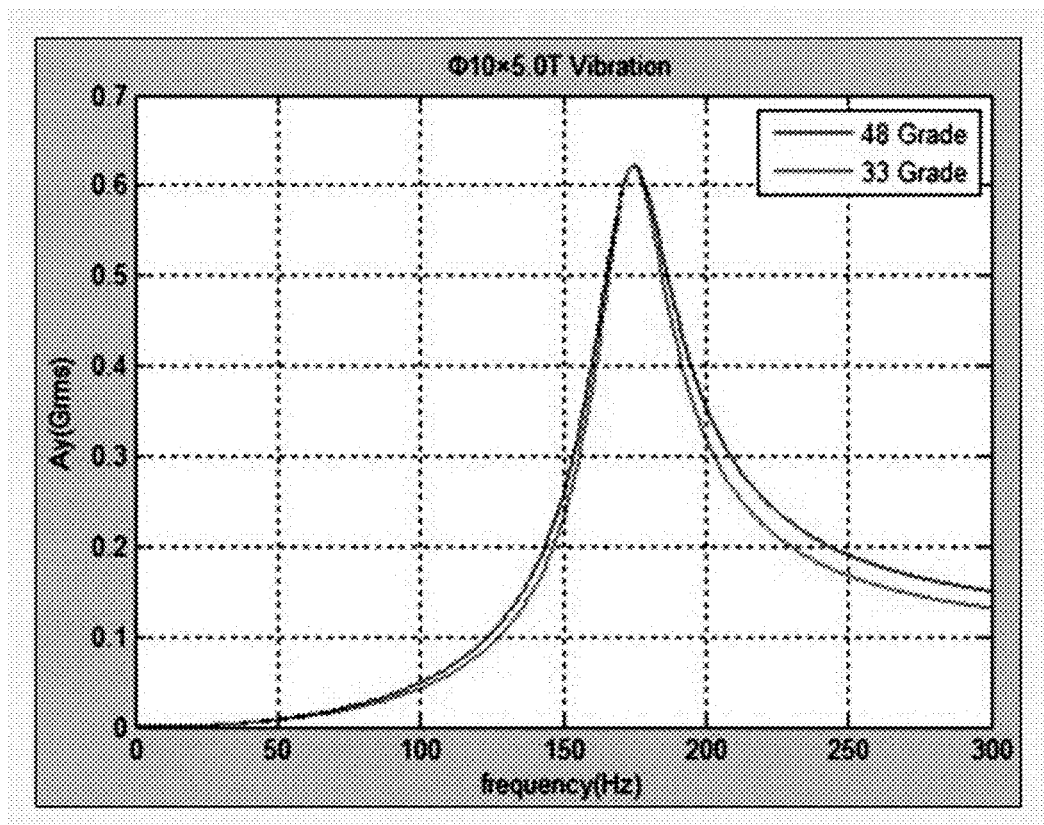
FIG. 5 is a graph illustrating relationship between frequency and vibration volume according to the second exemplary embodiment of the present disclosure.

FIG. 5 is a graph illustrating vibration volume resultant from frequency of linear vibrator according to the second exemplary embodiment of the present disclosure, where resonant frequency was 175 Hz, modulus of elasticity of spring was 1560 N/m, weight of the trembler was 1.33 g, and maximum energy products indicating magnetic flux volumes of magnets were 48 Megagauss-Oersteds (MGOe) and 33 MGOe.

The range indicating effective vibration volume was approximately 129 Hz to 134 Hz for lower limit and 310 Hz to 435 Hz for upper limit. Thus, actual useable frequency band was from 181 Hz to 301 Hz, such that it should be noted that the actual useable frequency band has markedly increased over that of the prior art.

Meanwhile, in this case, the tremblery forces were respectively 9.59 g·f and 11.69 g·f at the maximum, and an air gap was 0.2 mm.

Therefore, the linear vibrator according to the second exemplary embodiment of the present disclosure has an advantage in that, albeit an outer diameter being approximately from 10ϕ to 12ϕ, sufficient vibratory force can be generated in a broadband of 200~300 Hz to oscillate various types of vibratory forces.

Meanwhile, a mobile device arranged with the linear vibrator based on the concept according to the present disclosure will be described.

Recently, mobile devices with tactility along with light sense and auditory sense come into focus, and a device using the tactility is called a haptic device.

The haptic device is widely employed in various fields such as mobile devices including smart phones and portable PCs, virtual reality, wearable computers and robotics, which is called haptic interface.

As explained, mobile devices using the conventional linear vibrator cannot utilize various types of vibrations due to limit in size and vibratory force, and in order to address the conventional problems, a linear vibrator according to the concept of the present disclosure has been thus proposed.

The mobile device generally includes a display outputting an image, a touch pad inputting an execution command through touch, a vibration unit providing a vibration output, a sound output unit outputting sounds, and a controller outputting an image, sound and a vibration control signal. The linear vibrator according to the present disclosure is employed as the vibration unit.

As explained above, it should be apparent that the configuration thus described for the linear vibrator according to the present disclosure can increase vibratory force and broaden bandwidth capable of generating vibration, whereby various types of vibrations can be outputted and the broadened bandwidth can be set up.

In case the bandwidth is increased to several kHz to scores of kHz, vibration as well as sound can be outputted. Therefore, a mobile device formed with a linear vibrator capable of simultaneously outputting sound and vibration is provided based on another concept of the present disclosure.

Vibration and sound may be simultaneously outputted from a same linear vibrator or from different linear vibrators based on how to set up the linear vibrator. Furthermore, if the size and output of the linear vibrator are increased, the linear vibrator may replace a sound output unit. If the trembler replaces a speaker functioning to output sound, it is noteworthily advantageous that the mobile device can be structurally simplified and miniaturized.

In case of a mobile device formed with a linear vibrator capable of simultaneously outputting sound and vibration, a controller is preferably allowed to set up a vibration mode and a sound mode separately.

Therefore, in case of setting up the vibration mode, the vibration output can be detected because frequency less than approximately 300 Hz is set up as useable frequency. In case of setting up the sound mode, the sound output can be detected because frequency in the range of 300 Hz to 15,000 Hz is used.

Furthermore, in case a vibration plate or a trembling plate is formed inside the mobile device or linear vibrator, the sound and vibration effects can be further increased, and sound and vibration can be simultaneously generated. Meanwhile, it should be apparent that one linear vibrator may be formed or two or more linear vibrators may be arranged if necessary.

The linear vibrator based on a concept according to the present disclosure has an industrial applicability in that a vibration bandwidth can be greatly broadened over that of the conventional art to increase a frequency range detectable by a user and to allow the user to experience various types of vibration feelings.

The linear vibrator based on a concept according to the present disclosure has another industrial applicability in that a structure capable of providing a strong electromagnetic force can be provided in order to compensate set-up of practical region of vibration frequency deviated from resonant frequency, whereby an effect of the linear vibrator having broadband can be further increased.

The above-mentioned linear vibrator according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents.

While particular features or aspects may have been disclosed with respect to several embodiments and drawings, such features or aspects may be selectively combined with one or more other features and/or aspects of other embodiments as may be desired.

What is claimed is:

1. A linear vibrator, the linear vibrator comprising:
a case providing an inner space;
a vibrator including a yoke formed with a circular plate-shaped wing unit, a one inner lateral end-closed, cylindrical insertion unit bent from the wing unit to have a stair, an inner magnet coupled by being inserted into the insertion unit, and an external magnet coupled to one surface of the wing unit;
an elastic member fixed at one end to the case and fixed at the other end to the vibrator;
a stator fixed to the case to vibrate the vibrator;
a weight, which is made of a magnetic material, coupled to the other surface of the wing unit; and
a magnetic fluid coated in a ring shape on a space formed by the yoke and the elastic member to fix a position by magnetic flux leaked from the inner magnet,
wherein each of the inner and external magnets has an opposite magnetic polarity to a direction of vibrating the vibrator,
wherein the linear vibrator oscillates a vibration frequency detectable in the range of 30 Hz to an upper side ~1.50Hz to the bottom side,
wherein a frequency band up to a maximum usable frequency detectable by vibration or sound source based on resonant frequency is 1.2 times greater than a frequency band to a minimum usable frequency, and
wherein a magnetic flux of the inner magnet is formed downwards of a trembler of the linear vibrator, and a magnetic flux of the outer magnet is formed upwards of the trembler.

2. The linear vibrator of claim 1, further comprising a plate coupled to the external magnet and a bottom end of the inner magnet.

3. The linear vibrator of claim 2, wherein at least one of the yoke and the plate is formed with a magnetic material.

4. The linear vibrator of claim 1, wherein a resonant frequency of the linear vibrator is lower than a useable frequency detectable by vibration or sound source.

* * * * *